Sept. 16, 1941.     J. B. TUPPER     2,256,064
PHOTOGRAPHIC REPRODUCTION APPARATUS
Filed June 8, 1940      2 Sheets-Sheet 1

INVENTOR
JOHN B. TUPPER
BY
ATTORNEYS

Sept. 16, 1941.    J. B. TUPPER    2,256,064
PHOTOGRAPHIC REPRODUCTION APPARATUS
Filed June 8, 1940    2 Sheets-Sheet 2
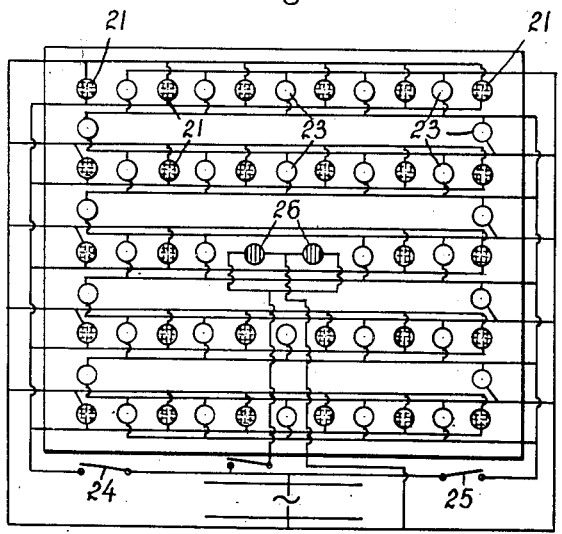
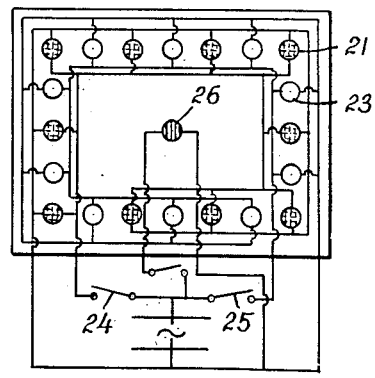
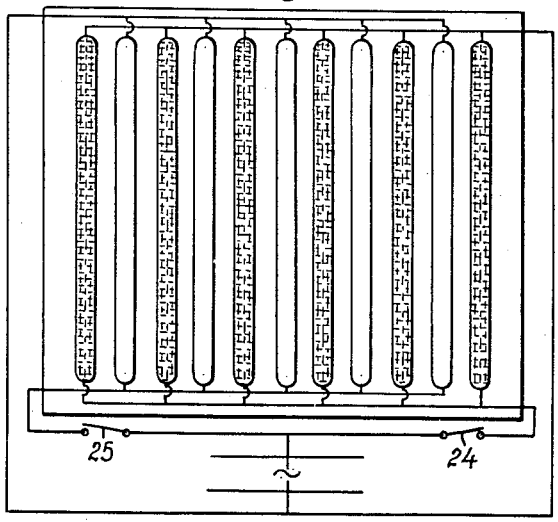
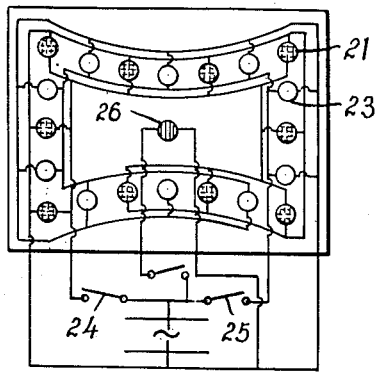
INVENTOR
JOHN B. TUPPER
BY
ATTORNEY Patented Sept. 16, 1941

2,256,064

UNITED STATES PATENT OFFICE 2,256,064

PHOTOGRAPHIC REPRODUCTION APPARATUS

John B. Tupper, Upper Montclair, N. J.

Application June 8, 1940, Serial No. 339,417

7 Claims. (Cl. 95—73)

This invention relates to a new and improved photographic printing apparatus of the character employed for making photographic prints by reflex reproduction methods. In such apparatus a sheet of sensitized photographic paper and an object to be reproduced (such, for example, as a written or printed page) are mounted in a frame, and the frame with the sensitized paper and object therein is exposed to a delimited illuminated field. The invention contemplates the provision of improved means providing for illuminating the field of exposure, comprising a first set of lamp receptacles suitably connected in a negative reproduction circuit within the limits of said field, lamps for illuminating said field with light rays in the vicinity of the yellow portion of the spectrum mounted in said lamp receptacles, a second set of lamp receptacles suitably connected in a positive reproduction circuit also within the limits of said field, and lamps for illuminating said field with light rays in the vicinity of the blue portion of the spectrum mounted in said second set of receptacles. Each set of the receptacles with lamps therein is so arranged as to illuminate the same delimited field of exposure to which the frame with photographic paper and object to be reproduced mounted therein is exposed for photographic reproduction. Separate switch control means are provided for the negative reproduction circuit and for the positive reproduction circuit, whereby the lamps giving off light rays in the vicinity of the yellow portion of the spectrum only may be energized to illuminate the delimited field of exposure when a photographic negative is to be reproduced from an object, and the lamps giving off light rays in the vicinity of the blue portion of the spectrum only may be energized to illuminate said delimited field of exposure when a photographic positive is to be reproduced from a negative. The invention thus provides a flexible lighting arrangement for the apparatus. This arrangement is of great advantage in apparatus used for making negative as well as positive prints, particularly by the reflex method of photographic printing.

In reproducing a negative from an object by reflex reproduction methods it is important to avoid the use of actinic light rays of too great intensity. If the light used is too strongly actinic, the negative lacks contrast. If only moderately actinic light rays in the vicinity of the yellow portion of the spectrum, such as amber, yellow, green, or orange light rays, are used, this difficulty is obviated and the resulting reflex negative has adequate contrast.

However, light rays in the vicinity of the yellow portion of the spectrum are unsatisfactory in reproducing a positive from a negative. It is therefore advantageous to use a source of light, such as white, blue or violet lamps, capable of producing strongly actinic light rays in the vicinity of the blue portion of the spectrum when reproducing a positive from a negative.

The present invention provides improved photographic reproduction apparatus, embodying the novel means described above for illumination of the exposure field, by means of which clear, sharp negatives of adequate contrast can be made from objects, and clear, sharp positives can be made from such negatives, by exposure in each case of sensitized paper to light of the proper actinic intensity.

The invention will be better understood from the following description, considered in connection with the accompanying drawings, in which:

Fig. 3 is a plan showing the arrangement of incandescent lamps in one form of apparatus;

Figs. 4 and 5 are plans showing modified arrangements of incandescent lamps; and Fig. 6 is a plan showing an arrangement of tubular lamps.

Figure 1:
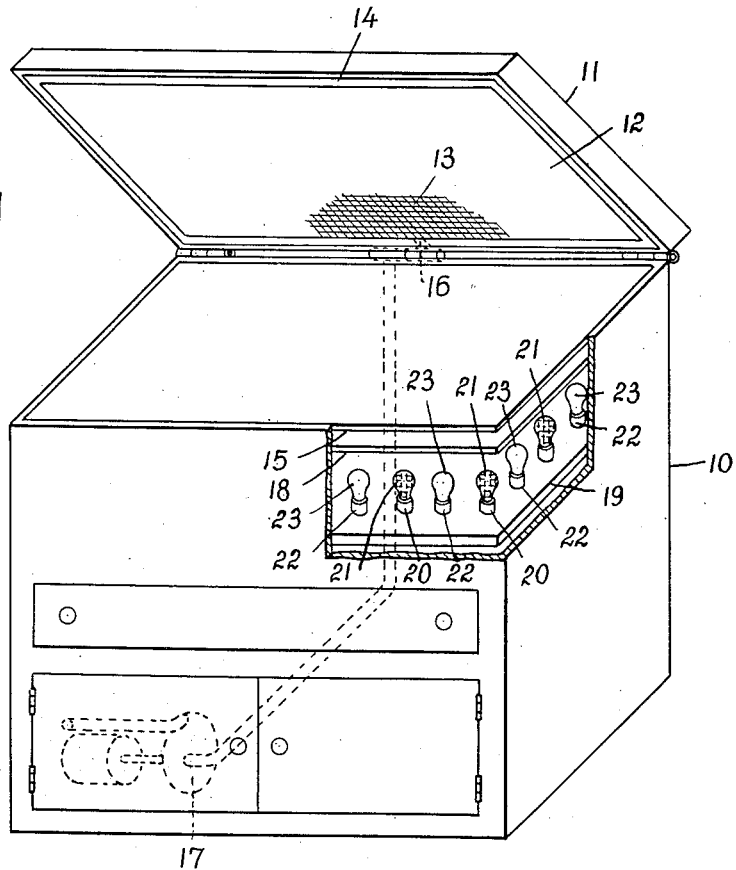
Fig. 1 is a perspective of the complete apparatus with part of the cabinet cut away.

The complete apparatus comprises a cabinet 10 having a cover 11. The cover 11 is hingedly mounted on the cabinet 10 so that it may be closed or opened.

The inner underface of the cover 11 is lined with a rubber mat 12 having a face 13 composed of a series of tiny pyramidal projections with air channels therebetween.

The perimeter of the cover 11 is outlined on the underside thereof with a projecting soft rubber edging 14. The soft rubber edging 14 is adapted to form an air-tight seal between the cover 11 and the cabinet 10 when the former is closed.

A sheet of plate glass 15 forms the top of the cabinet 10 and provides a smooth surface of transparent or translucent material upon which objects to be reproduced may be placed in contact with sensitized paper. The smoothness of the glass aids in forming an airtight joint between the cover and the cabinet if the soft rubber edging 14 presses upon and flattens out against the glass.

A small tube 16 leads from the cover 11 and is connected to suitable vacuum creating means such as a pump 17. When the cover 11 is closed and the vacuum pump 17 set in operation, air is sucked from the space enclosed between the rubber mat 12 and the plate of glass 15. The air channels between the pyramidal projections permit air to be withdrawn from under the entire surface of the mat. In this manner a uniform pressure is applied for pressing an object to be reproduced into tight contact with a sheet of sensitized paper when the two are in position between the rubber mat 12 and the plate of glass 15.

The above-described means for employing vacuum to secure close contact between the object to be reproduced and the sensitized paper is effective and convenient to use, but it is understood that the invention is not limited to this structure, and that any other suitable means for securing proper contact between the photographic paper and the object may be employed.

Beneath the plate glass 15 and in a parallel plane is a sheet of opal or other light-diffusing glass 18. If desired the opal glass 18 may be omitted and a single sheet of plate glass having an opal flashing or other diffusing layer formed on its undersurface may be used in the position of the plate glass 15 or, in some cases, opal diffusing may be eliminated altogether.

Below this sheet of opal glass 18 is a base 19 adapted to receive lamp receptacles and lamps for illuminating the delimited, generally rectangular field of exposure defined by the plate glass 15. A first set of lamp receptacles 20 connected in a negative reproduction circuit is disposed on the lamp base adjacent the corners of the field and along the side edge portions thereof. Lamps 21 for illuminating the exposure field with light rays in the vicinity of the yellow portion of the spectrum are mounted in these receptacles 20. Amber colored lamps are generally preferred for this purpose.

A second set of lamp receptacles 22 connected in a positive reproduction circuit are disposed on the base 19 along the same side edge portions of the exposure field. Each receptacle 22 of the second set is positioned between an adjacent pair of receptacles 20 of the first set. Mounted in the lamp receptacles 22 of the second set are lamps 23 for illuminating the exposure field with light rays in the vicinity of the blue portion of the spectrum. Lamps giving off white light are desirable for this purpose.

The lamp receptacles 20 of the first set are controlled by a switch 24, and the lamp receptacles 22 of the second set are controlled by a separate switch 25. This enables the amber lamps 21 in the first set of receptacles alone to be lighted to illuminate the field of exposure when a negative is to be reproduced from an object. Conversely, the white lamps 23 in the second set of lamp receptacles 22 alone may be lighted when a positive is to be reproduced from a negative.

If desired, the switches 24 and 25 may be arranged so that only one of the two sets of lamps may be turned on at one time.

On the same lamp base 15 may be positioned ruby-colored pilot lamps 26 for convenience in operating the apparatus in the dark. The pilot lamps 26 are usually located adjacent the center portion of the exposure field. The pilot lamps are not in circuit with the other lamps, but rather are controlled by a separate pilot lamp switch.

In a preferred embodiment of the invention the lamps 21 in the first set of receptacles are incandescent lamps giving off substantially amber colored light, while the lamps 23 in the second set of receptacles are incandescent lamps giving off substantially white light. As stated above, lamps giving off a light whose color is in the vicinity of the yellow portion of the spectrum, such as orange, yellow, or green, may be used instead of amber. Instead of substantially white light lamps giving off a light whose color is in the vicinity of the blue portion of the spectrum, such as blue or violet, may be used.

The color of the lights may be produced in different ways. In the preferred embodiment incandescent colored glass lamps rated at about 40 watts are used. But the same effect may be obtained by covering or coating clear glass lamps with a coloring material or substance, or by the use of suitable gas discharge lamps.

Since the amber light is not as bright as the white light, it is advantageous to arrange the lamps producing the amber colored light so that the portions of the exposure field most difficult to illuminate may obtain a sufficiency of amber light. There are of course many possible arrangements of the lamp receptacles of each set with their respective lamps, but it has been found most advantageous to arrange the receptacles according to a general scheme. This general scheme comprises disposing the lamp receptacles 20 of the first set on the lamp base adjacent the corners of the field of exposure and about the marginal portions thereof. The second set of lamp receptacles 22 are disposed on the base about the marginal portions of the exposure field with a receptacle of the second set positioned between each adjacent pair of receptacles of the first set.

The lamp receptacles of the first set are advantageously positioned on the base adjacent the corners of the exposure field because the corner portion is hardest to illuminate properly. The lamp receptacles of both sets are arranged in a row on the base 19 about the marginal portions of the exposure field, with lamp receptacles of the first set arranged alternately with lamp receptacles of the second set, as the light reflects in toward the center more readily than out to the sides.

The pilot lamp or lamps 26 are usually placed near the center of the lamp receptacle base adjacent the center portion of the exposure field.

In an apparatus for printing large objects in which there would of necessity be a relatively large plate of glass 15 forming the top of the cabinet 10, it may be necessary to have more light to properly illuminate the exposure field than can be supplied by the single row of lamps about the marginal portions of the exposure field. In such case it has been found to be advantageous to arrange the lamp receptacles according to the general scheme and adding additional rows, as shown in Fig. 3. The additional rows of lamp receptacles extend from each lamp receptacle of the first set positioned on one side of the exposure field to the corresponding lamp receptacle of the first set positioned on the opposite side of the exposure field, each additional row of lamp receptacles comprising lamp receptacles of the first set arranged alternately with lamp receptacles of the second set. If pilot lamps 26 are desired, space may be provided for them by leaving out a few lamp receptacles in the row of lamp receptacles that passes through the center portion of the lamp receptacle base, or they may be positioned approximately at the center of the lamp base between the rows of lamp receptacles.

In apparatus having a relatively small exposure field, a single row of lamp receptacles about the marginal portions of the exposure field, arranged as shown in Fig. 4, has been found sufficient to provide for adequate illumination. This arrangement may be modified as shown in Fig. 5 by having the lamp receptacles positioned on the two long marginal edges curve inwardly towards the center of the exposure field, rather than having them positioned in a straight line parallel to and adjacent the marginal edge. The curve advantageously may be an arc whose point of furthest departure from the marginal edge is approximately midway between the marginal edge and the center of the exposure field.

Tubular lamps may also be used, arranged for example as shown in Fig. 6. In such event the lamp receptacles of the first set are disposed on the lamp base 19 adjacent two opposite corners of the exposure field and along two opposite sides thereof. The second set of lamp receptacles is disposed on the lamp base along the same two opposite sides of the field of exposure, with a receptacle of the second set positioned between each adjacent pair of receptacles of the first set. In this manner the general scheme is followed in that parallel to and adjacent two opposite marginal portions extends a tubular lamp giving off substantially amber colored light, and between these two outermost lamps are a series of tubular lamps giving off substantially while light alternating with tubular lamps giving off substantially amber light.

Figure 2:
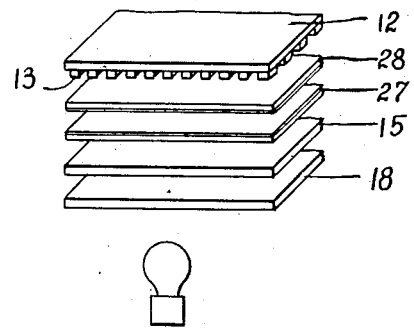
Fig. 2 is a diagrammatic drawing showing the relation of the object to be reproduced and the sensitized paper to the parts of the apparatus.

In operation of the apparatus for making reflex photographic reproductions, (illustrated diagrammatically in Fig. 2) the operator places a sheet of sensitized paper 27, with its sensitized surface usually facing up, on the plate glass 15. On top of the sensitized paper the object 28 to be reproduced is placed face down. The cover 11 is then closed and the vacuum pump is put into operation. Air entrapped between the cover 11 and the plate of glass 15 is withdrawn through the tube 20 and the object 28 is forced by the pressure of the atmosphere into tight contact with the sensitized paper 27.

If a negative is to be reproduced from an object, the operator switches on the negative circuit of lamp receptacles 20, thus lighting the amber colored lamps and illuminating the exposure field with light in the vicinity of the yellow portion of the spectrum. If on the other hand a positive is to be reproduced from a negative, the operator switches on the white lamps, illuminating the exposure field with a substantial amount of light in the blue portion of the spectrum. In either case optimum lighting conditions are created for making the kind of print desired.

Although the lighting means of the invention has been described above and shown in the drawings with particular reference to its embodiment in a particular form of cabinet equipped with vacuum means to secure close contact between the sensitized paper and the object, it is understood that the invention may equally well be embodied in a photographic reproduction apparatus of any other suitable form or construction.

I claim:

1. In photographic printing apparatus of the character in which a sheet of sensitized photographic paper and an object to be reproduced are mounted in a frame, and the frame with the sensitized paper and object therein is exposed to a delimited illuminated field, a cabinet, a substantially smooth transparent member mounted at the top of said cabinet and defining the delimited exposure field, a lamp receptacle base mounted immediately beneath the transparent member, and improved means providing for illumination of said field which comprise a first set of lamp receptacles mounted on said receptacle base and suitably connected in a negative reproduction circuit within the limits of said field, lamps for illuminating said field with light rays in the vicinity of the yellow portion of the spectrum mounted in said lamp receptacles, a second set of lamp receptacles mounted on said receptacle base and suitably connected in a positive reproduction circuit also within the limits of said field, lamps for illuminating said field with light rays in the vicinity of the blue portion of the spectrum mounted in said second set of receptacles, each set of receptacles with lamps therein being so arranged as to illuminate the same delimited field to which the frame with photographic paper and object to be reproduced mounted therein is exposed for photographic reproduction, and separate switch control means for the negative reproduction circuit and for the positive reproduction circuit, whereby the lamps giving off light rays in the vicinity of the yellow portion of the spectrum only may be energized to illuminate the delimited field of exposure when a photographic negative is to be reproduced from an object, and the lamps giving off light rays in the vicinity of the blue portion of the spectrum only may be energized to illuminate said delimited field of exposure when a photographic positive is to be reproduced from a negative.

2. In photographic printing apparatus of the character in which a sheet of sensitized photographic paper and an object to be reproduced are mounted in a frame, and the frame with the sensitized paper and object therein is exposed to a delimited illuminated field, a cabinet, a substantially smooth transparent member mounted at the top of said cabinet and defining the delimited exposure field, a lamp receptacle base mounted immediately beneath the transparent member, and improved means providing for illumination of said field which comprise a first set of lamp receptacles mounted on said receptacle base and suitably connected in a negative reproduction circuit within the limits of said field, lamps for illuminating said field with substantially amber colored light mounted in said lamp receptacle, a second set of lamp receptacles mounted on said receptacle base and suitably connected in a positive reproduction circuit also within the limits of said field, lamps for illuminating said field with substantially white light mounted in said second set of receptacles, each set of receptacles with lamps therein being so arranged as to illuminate the same delimited field to which the frame with photographic paper and object to be reproduced mounted therein is exposed for photographic reproduction, and separate switch control means for the negative reproduction circuit and for the positive reproduction circuit whereby the lamps giving off substantially amber colored light only may be energized to illuminate the delimited field of exposure when a photographic negative is to be reproduced from an object, and the lamps giving off substantially white light only may be energized to illuminate said delimited field of exposure when a photographic positive is to be reproduced from a negative.

3. In photographic printing apparatus of the character described, a cabinet, a substantially smooth generally rectangular translucent plate mounted at the top of said cabinet and defining a delimited generally rectangular exposure field, a base for lamp receptacles mounted directly below said transparent plate, a first set of lamp receptacles mounted on said base and connected in a negative reproduction circuit, receptacles of said first set being disposed on said base adjacent the corners of said delimited field of exposure and along at least two opposite side edge portions thereof, lamps for illuminating said field with substantially amber colored light mounted in said receptacles, a second set of lamp receptacles connected in a positive reproduction circuit disposed on said base along the same side edge portions of said field as the receptacles of the first set, with a receptacle of said second set being positioned between each adjacent pair of receptacles of said first set, lamps for illuminating said delimited field of exposure with substantially white light mounted in the receptacles of said second set, and separate switch control means for the negative reproduction circuit and for the positive reproduction circuit, whereby the lamps giving off substantially amber colored light only may be energized to illuminate the delimited field of exposure when a photographic negative is to be reproduced from an object and the lamps giving off substantially white light only may be energized to illuminate said delimited field of exposure when a photographic positive is to be reproduced from a negative.

4. In photographic printing apparatus of the character described, a cabinet, a substantially smooth generally rectangular translucent plate mounted at the top of said cabinet and defining a delimited generally rectangular exposure field, a base for lamp receptacles mounted directly below said transparent plate, a first set of lamp receptacles mounted on said base and connected in a negative reproduction circuit, receptacles of said first set being disposed on said base adjacent the corners of said delimited field of exposure and about the marginal portions thereof, incandescent lamps for illuminating said field with substantially amber colored light mounted in said receptacles, a second set of lamp receptacles connected in a positive reproduction circuit disposed on said base about the marginal portions of said field of exposure with a receptacle of said second set being positioned between each adjacent pair of receptacles of said first set, incandescent lamps for illuminating said delimited field of exposure with substantially white light mounted in the receptacles of said second set, and separate switch control means for the negative reproduction circuit and for the positive reproduction circuit, whereby the lamps giving off substantially amber colored light only may be energized to illuminate the delimited field of exposure when a photographic negative is to be reproduced from a negative and the lamps giving off substantially white light only may be energized to illuminate the delimited field of exposure when a photographic positive is to be reproduced from a negative.

5. In photographic printing apparatus of the character described, a cabinet, a substantially smooth generally rectangular translucent plate mounted at the top of said cabinet and defining a rectangular relatively large delimited exposure field, a base for lamp receptacles mounted directly below said transparent plate, a first set of lamp receptacles mounted on said base and connected in a negative reproduction circuit, receptacles of said first set being disposed on said base adjacent the corners of said delimited field of exposure and about the marginal portions thereof, a second set of lamp receptacles connected in a positive reproduction circuit disposed on said base about the marginal portions of said exposure field, with a receptacle of said second set being positioned between each adjacent pair of receptacles of said first set, rows of lamp receptacles extending from each lamp receptacle of the first set on one side of said exposure field to the corresponding lamp receptacle of the first set on the opposite side of said exposure field, said rows of lamp receptacles each comprising lamp receptacles of the first set arranged alternately with lamp receptacles of the second set, incandescent lamps for giving off substantially amber colored light mounted in said first set of lamp receptacles, incandescent lamps for giving off substantially white light mounted in said second set of lamp receptacles, switch control means for the lamp receptacles of the first set and separate switch control means for the lamp receptacles of the second set, whereby the lamps giving off substantially amber colored light only may be energized to illuminate the delimited field of exposure when a photographic negative is to be reproduced from an object and the lamps giving off substantially white light only may be energized to illuminate said delimited field of exposure when a photographic positive is to be reproduced from a negative.

6. In a photographic printing apparatus of the character described, a cabinet, a substantially smooth generally rectangular translucent plate mounted at the top of said cabinet and defining a delimited generally rectangular exposure field, a base for lamp receptacles mounted directly below said transparent plate, a first set of lamp receptacles connected in a negative reproduction circuit, receptacles of said first set being disposed on said base adjacent the corners of said delimited field of exposure and along two opposite marginal portions thereof, a second set of lamp receptacles connected in a positive reproduction circuit, receptacles of said second set being disposed on said base along said two opposite marginal portions of the field of exposure with a receptacle of said second set being positioned between each adjacent pair of receptacles of the first set, tubular lamps emitting substantially amber colored light mounted in said first set of lamp receptacles, tubular lamps emitting substantially white light mounted in said second set of lamp receptacles, switch control means for the lamp receptacles of the first set, and separate switch control means for the lamp receptacles of the second set, whereby the tubular lamps giving off substantially amber colored light only may be energized to illuminate the delimited field of exposure when a photographic negative is to be reproduced from an object, and the tubular lamps giving off substantially white light only may be energized to illuminate said delimited field of exposure when a photographic positive is to be reproduced from a negative.

7. In photographic printing apparatus, a boxlike cabinet, a light diffusing plate of glass forming the top of said cabinet, a hinged cover so adapted as to hold sensitized paper and an object to be reproduced in contact with each other and with the plate of glass, a lamp base positioned beneath said glass plate, a first set of lamp receptacles mounted on said base and connected in a negative reproduction circuit, receptacles of said first set being disposed on said base adjacent the corners of said glass plate and about the marginal portions thereof, lamps for giving off substantially amber colored light mounted in said receptacles, a second set of lamp receptacles mounted on said base and connected in a positive reproduction circuit, receptacles of said second set being disposed on said base about the marginal portions of the glass plate with a receptacle of said second set being positioned between each adjacent pair of receptacles of said first set, lamps for giving off substantially white light mounted in the receptacles of the second set, and separate switch control means for the negative reproduction circuit and for the positive reproduction circuit, whereby the lamps giving off substantially amber colored light only may be energized to illuminate said glass plate when a photographic negative is to be reproduced from an object, and the lamps giving off substantially white light only may be energized to illuminate the glass plate when a photographic positive is to be reproduced from a negative.

JOHN B. TUPPER.

CERTIFICATE OF CORRECTION.

Patent No. 2,256,064.   September 16, 1941.

JOHN B. TUPPER.

It is hereby certified that error appears in the printed specification of the above numbered patent requiring correction as follows: Page 3, first column, line 35, for the word "while" read --white--; page 4, second column, line 40, claim 6, strike out the article "a" after --In--; and that the said Letters Patent should be read with this correction therein that the same may conform to the record of the case in the Patent Office.

Signed and sealed this 21st day of October, A. D. 1941.

(Seal)

Henry Van Arsdale,
Acting Commissioner of Patents.